April 25, 1950 — C. W. BAKER — 2,504,957
MACHINE FOR UPPER TRIMMING
Filed Nov. 9, 1948 — 2 Sheets-Sheet 1
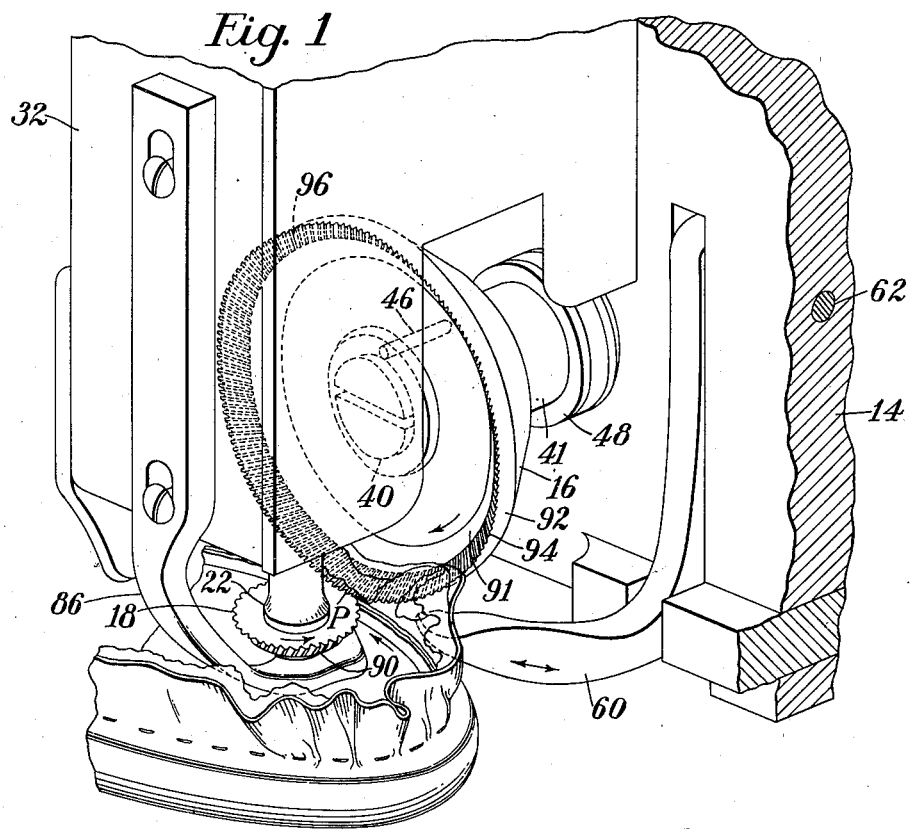
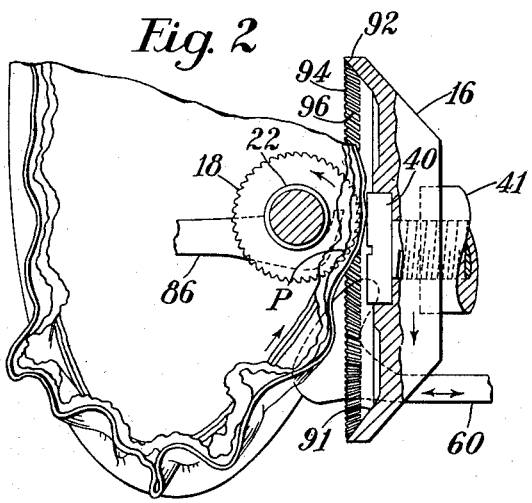
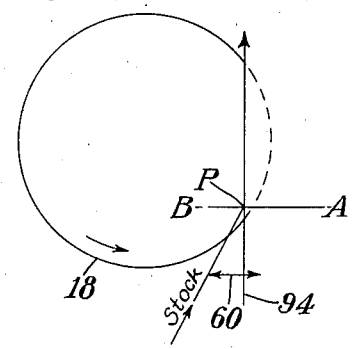
Inventor
Corwin W. Baker
By his Attorney Inventor
Corwin W. Baker
By his Attorney Patented Apr. 25, 1950

2,504,957

UNITED STATES PATENT OFFICE 2,504,957

MACHINE FOR UPPER TRIMMING

Corwin W. Baker, Beverly, Mass., assignor to United Shoe Machinery Corporation, Flemington, N. J., a corporation of New Jersey Application November 9, 1948, Serial No. 59,133

7 Claims. (Cl. 12—83.5)

This invention relates to trimming machines for use in the manufacture of footwear, and more particularly to machines for severing surplus material from the uppers of shoes by the shearing action of a pair of cooperatively related rotary cutters. While the invention is illustrated in connection with the trimming of surplus upper material from the bottom of shoes, it will be understood that the invention in its more general aspects is not limited in its application to upper trimming nor even necessarily to machinery for operating on the materials of footwear.

A partially fabricated welt shoe, when lasted, normally has a surplus of upper material upstanding and extending marginally about the forepart and toe portion. Proper removal of this marginal surplus stock from the lasted upper, particularly around the toe portion, better prepares a shoe for the welt-sewing and inseam trimming operations which ordinarily follow. The upper is usually comprised of leather, cloth lining, doubler, and, at times, a thick, stiff box toe. Since the composition of uppers may vary from a thin, soft and pliable form to the tough and crimped shape found in some athletic and work shoes, a rugged yet adaptable type of trimming machine for severing such surplus material is needed. Normal upper trimming, not to mention the occasional lasting tack or staple which may be encountered, wears and dulls the cutting tools and presents other problems which are not dealt with in an entirely satisfactory manner by some machines now in use. Accordingly, some desirable considerations in an upper trimming machine in addition to improved operating longevity are lower initial and maintenance costs, ease and rapidity of operation by even unskilled operators, and means for avoiding the risk of damage due to marring or unlasting shoes.

In view of the above, it is an object of this invention to provide an improved trimming machine which shall be of simple construction, require little or no skill in operation, yet effectively shear the work without unduly disturbing the latter or impairing the trimming elements.

One feature of the invention resides in the provision of a concave rotary cutter comprising a smooth cylindrical surface provided with a circular cutting edge and a rotary disc cutter having a peripheral portion approximately tangential to said surface and lying in a plane substantially perpendicular to that of the edge.

Another feature of the invention pertains to the means whereby said cutters cooperate while shearing the work to feed the latter, said means comprising internally coned ribs or teeth adjacent the cylindrical surface of one cutter and externally coned ribs or teeth on the periphery of the other cutter, said teeth having cross-sections uniformly inclined in the direction of the feed.

These and other features of the invention will now be more fully described with reference to an illustrative shoe trimming machine shown in the accompanying drawings, in which, Fig. 1 is an angular view of the operating cutters of a machine embodying the present invention, the relationship of the cutters to each other and to a shoe bottom being shown as normally viewed by an operator;

Fig. 2 is a plan view of the working elements seen in Fig. 1, a part of the larger cutter being broken away;

Fig. 4 is a schematic diagram of the cutting action with respect to the smaller cutter.

Figure 3:
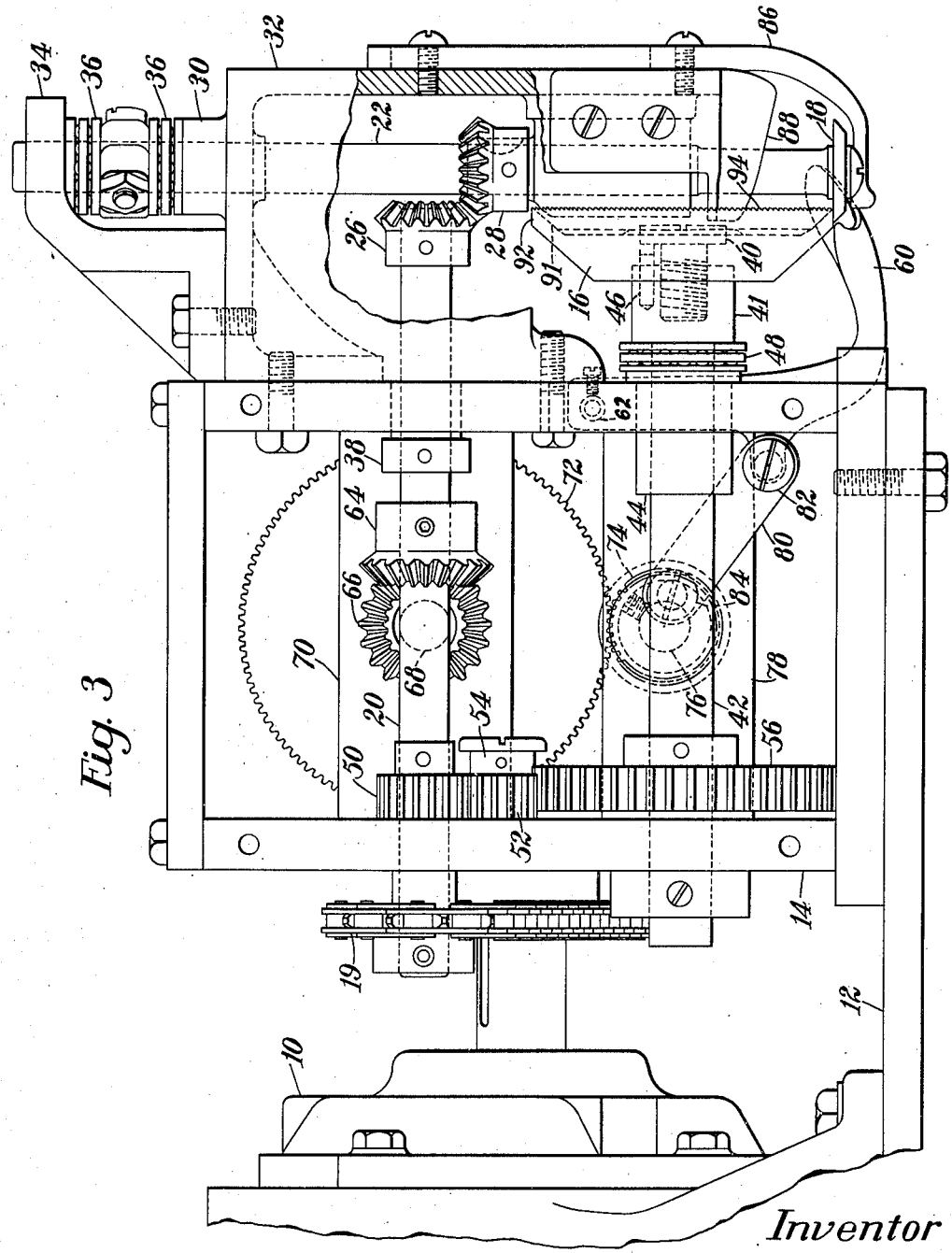
Fig. 3 is a side elevation of the machine with a portion broken away and showing its drive mechanism.

Referring first to Fig. 3, an electric motor 10 is supported on a platform 12 and, by means of suitable shafting and gearing supported by a housing 14 mounted on the platform, it drives two rotary trimming cutters 16 and 18, hereinafter to be described, with substantially equal peripheral speeds. The means for operating the cutter 18 comprises a chain and sprocket connection 19 between the motor drive shaft and a horizontal driven shaft 20 journaled in the housing 14, a vertical shaft 22 carrying the cutter 18 at its lower extremity and bevel gears 26, 28 respectively carried in meshing engagement by the shafts 20 and 22. The shaft 22 is rotatably supported by a hub 30 formed in an upper portion of a cutter-guard frame 32 bolted to the housing 14, an upper end of the shaft 22 being inserted in a bearing bracket 34. A pair of spaced ball bearings 36, 36 mounted on the shaft 22 acts to receive vertical thrust on the latter. A collar 38 affixed within the housing 14 to the shaft 20 serves to maintain the latter against displacement in one direction by lateral thrust.

The cutter 16 is secured by a bolt 40 threaded into an enlarged end 41 (Fig. 3) of a horizontal shaft 42 (having axis A—B in Fig. 4) which is received by a sleeve bearing 44 and journaled in the housing 14. A pin 46 is seated within the base of the cutter 16 and is dowelled into the shaft 42 to prevent loosening of the bolt 40 and to lock the cutter 16 against rotation relatively to said shaft. A ball bearing 48 mounted on the shaft 42 acts to receive lateral thrust transmitted by the cutter 16. The means whereby power for operating the cutter 16 is transmitted comprise a gear train including a driving pinion gear 50 affixed to the shaft 20, an idler gear 52 secured to a stub shaft 54 affixed in the housing 14, and a driven gear 56 affixed to the shaft 42.

In addition to the cooperative shearing cutters 16 and 18, another powered element of the illustrated machine, a reciprocable wiper 60, is normally arranged to engage the work for purposes hereinafter to be described. The wiper 60, sometimes referred to as a leather pusher, is L-shaped, one end projecting from the housing 14 and being suitably rounded repeatedly to engage the work without danger of marring it and the other end being pivotally supported in a kerf of the housing 14 by a pin 62. The mechanism for actuating the wiper 60 comprises a bevel gear 64 secured to the shaft 20 and driving a bevel gear 66 mounted on a horizontal shaft 68 rotatably supported by parallel cross pieces 70 (only one shown) of the housing 14. A spur gear 72 mounted on the shaft 68 meshes with a smaller gear 74 that is mounted on a driven shaft 76, the latter also being supported rotatably by two parallel cross pieces 78 (only one shown) of the housing. A link 80, having connection with the wiper 60 by means of a pivot pin 82, also is provided with a pivot pin 84 which is eccentrically affixed to the hub of gear 74.

A conventional depth gage or shoe bottom rest 86 is adjustably secured to the frame 32 and has a depending portion underlying the cutter 18 to bear against the bottom of an insole when a sole is presented to the machine, as viewed in Figs. 1 and 2. A second stationary accessory, also affixed to the frame 32, is a deflector 88 (Fig. 3), its lower portion being so disposed as to assure that severed material will be guided away from the locality of shearing without impairing an operator's view of the work and also to avoid the fouling of the cutter shafts.

It will be noted that the cutter 18 is disk-like and is in the form of a cone frustum having a flat, smooth upper face for shearing, its perimeter constituting a circular cutting edge disposed in a horizontal plane. The diameter of this face is considerably less than that of the cutter 16 enabling the cutter 18 to engage progressively the uppers of small shoes, even those having pointed toe portions. The work engaging exterior of the cutter 18 is provided with serrations 90 (Fig. 1) thereby forming teeth in its cutting edge having cross sections uniformly inclined in the direction of rotation. For work feeding purposes these teeth bite into the stock just below the shearing line. The larger cutter 16 has a concave or dished interior surface 91 and has a smooth cylindrical exterior surface 92 that partially overlies, and is approximately convergent or tangential with, the upper face of the cutter 18 approximately at its perimeter, or at a shear point designated P (Figs. 1 and 4) located at or near the root of its work-gripping teeth. The cylindrical surface 92 is bounded by a circular and serrated cutting edge 94 (Fig. 1) which lies in a plane substantially perpendicular to that of the cutter 18, the sharp edge 94 being the acute intersection with the cylindrical surface 92 of internal serrations or ribs 96 having cross-sections uniformly inclined in the direction of rotation of the cutter 16. The cutting edge 94 is thereby formed with work gripping teeth which recede therefrom but may bite into the stock just above the shear line.

The serrations 90 and 96, instead of being radial to their respective cutting edges, form inclined grooves having a slope which facilitates their self-cleaning during operation.

As may be best seen in Figs. 2 and 4 the shaft 42 is offset from the shaft 22 so that the cutting edges of the cutters come into proximity with each other to form an acute angle for shearing. The cutting edge 94 is accordingly substantially tangential to the face of the cutter 18 at a shear point P that is readily visible to an operator. The arrangement is advantageous, moreover, in that shearing action localized at the point P is effected between two driven surfaces, namely, the cylindric surface 92 and the upper face of the cutter 18, where their wear through friction will be small due to the lack of differential in their speeds. It will be noted, too (Fig. 4), that the point P being fixed and the limit of movement of the wiper 60 toward a shoe being fixed, the operator may not easily present the work to feed it along a line other than the one which point P, gage 86, and wiper 60 correctly establish. This feed angle tends to enable the cutters to divide the cutting load and no resultant shear force acts upon the shoe tending to unlast it. The arrangement, while effectively utilizing the shearing power of the machine, places little strain on the operating parts or on the operator.

In operating the machine to trim shoe uppers an operator will permit the cutters 16, 18 to be driven continuously by the motor 10, and at the same time the wiper 60 will be vibrated by the mechanism above referred to. The operator, as is customary with upper trimmers, presents an inverted lasted shoe to the machine with the insole margin and rib supported in frictional engagement progressively with the shoe bottom rest 86. The upper stock will be engaged from one side and below the line of shearing by the cutting edge of the cutter 18, its serrations 90 tending to feed the stock of the shoe upper up to and beyond the shearing point P. Similarly, the surplus upper stock will be engaged from the other side and above the line of shearing by the cutter 16, the teeth of its cutting edge 94 tending to feed the stock up to the point P and then urging the severed strip beyond that point.

As continuous shearing is effected by the cooperating cutters there sometimes is a tendency for successive segments of the upper stock to be bent over by the cutters or by reason of the way a shoe has been lasted. This bending of the stock could occasionally result in the shear cut not being completely through the stock or prevent the shear from continuing along a single smooth line of operation. Accordingly, the rapidly reciprocating wiper 60 moves toward and from the stock, engaging it just before it reaches the shear point P to straighten the stock upwardly and thus aid in positioning it for through shearing by the cooperating cutters. The movement of the wiper as it approaches the shoe is along an upward path such that the shoe itself is not contacted thereby nor is any unlasting stress exerted. It will be recognized that other means than the wiper 60, such as a pair of cooperatively rotating spindles, for example, might be substituted for steadily positioning the uncut surplus upper material with relation to the shearing cutters without departing from the spirit of this invention.

While the pair of cutters 16, 18 may be individually removed from their drive shafts for sharpening without great inconvenience, it is an advantage of the illustrative machine and this invention that normally they need not be detached for grinding. Sharpening of the cutter 16 may be readily effected to remedy ordinary dullness by horizontaly applying a grinding stone, held by hand, to the cylindrical surface 92 as the latter rotates. Similarly, a hand-held grinding stone applied to the upper face of the rotating cutter 18 will normally recondition it promptly and satisfactorily. Though not shown in the attached drawings, it will be obvious that a grinding means may be pivotally affixed to the machine frame for steady support whereby improved accuracy in sharpening both cutters may be obtained. The angular serrations 96 and 96 do not interfere with grinding, but provide work gripping surfaces that are not difficult to construct yet are easily cleaned and tend to be self-cleaning.

Having thus described my invention, what I claim as new and desire to secure by Letters Patent of the United States is:

1. A trimming machine comprising two power driven cutters arranged to rotate on axes perpendicular to each other, one of said cutters having an exterior cylindrical surface and a concave surface forming an acute annular cutting edge, the other one having a flat face and a beveled perimeter forming an acute cutting edge, said flat face being approximately tangential to said cylindrical surface, and said cutting edges being situated in shearing relation to each other.

2. A machine for trimming shoe uppers comprising a powered rotary disk cutter, and a driven concave cutter provided with a smooth cylindrical surface arranged in shearing relation to the cutting edge of said disk cutter, the latter lying in a plane substantially perpendicular to that of the annular edge of said cylindrical surface.

3. A trimming machine comprising two power driven cutters arranged to rotate on axes substantially perpendicular to each other, one of said cutters having an exterior cylindrical surface and a concave surface forming an acute annular cutting edge, said concave surface having grooves angularly intersecting said cylindrical surface to form work-gripping teeth in said annular cutting edge, the other cutter having a flat face and a beveled perimeter forming an acute cutting edge, said flat face being tangential to said cylindrical surface, and said cutting edges being situated in shearing relation to each other.

4. A trimming machine as set forth in claim 3, further characterized in that the beveled perimeter of the one cutter is provided with grooves angularly intersecting said flat face to form work-gripping teeth in its cutting edge.

5. A trimming machine for shoe uppers comprising a horizontal rotary disk cutter for engaging the inner surface of the surplus marginal shoe upper stock, the disk being provided with a circular series of angular serrations, a concave cutter having a horizontal axis of rotation, said concave cutter having an annular cutting edge formed by the intersection of internal angular serrations and an external cylindrical surface, said surface overlying less than half of said disk cutter and being approximately tangential with the cutting edge of the latter to intersect the marginal stock, and power driven means by which said cutters are rotated cooperatively to effect continuous shearing.

6. A trimming machine as defined in claim 5 in which a depth gage is supported beneath said disk cutter for engagement with the shoe bottom, and a member is movable into and out of engagement with the stock ahead of but close to the shearing locality, said gage and member serving to position successive segments of the work with respect to the cutters.

7. A trimming machine comprising a horizontal shaft and an offset vertical shaft extending below one end of said horizontal shaft, a rotary cutting disk mounted on the lower extremity of said vertical shaft, a concave cutter mounted on said horizontal shaft and having a cylindrical surface with a cutting edge lying in a plane substantially perpendicular to said disk, said cutting edge being approximately tangential to the perimeter of said disk, and power means for driving said shafts to effect continuous shearing by said cutters at their point of tangency.

CORWIN W. BAKER.

No references cited.